United States Patent [19]
Dhong et al.

[11] Patent Number: 6,065,028
[45] Date of Patent: May 16, 2000

[54] MULTIFUNCTIONAL MACRO

[75] Inventors: Sang Hoo Dhong; Joel Abraham Silberman, both of Austin, Tex.

[73] Assignee: International Business Machines Corporation, Armonk, N.Y.

[21] Appl. No.: 08/716,818

[22] Filed: Sep. 16, 1996

[51] Int. Cl.[7] ....................................................... G06F 7/38
[52] U.S. Cl. .......................................... 708/230; 708/232
[58] Field of Search ......................... 364/716.01, 716.03, 364/716.04, 716.05, 716.06, 716.07, 784.01, 784.02, 784.03; 708/230, 232, 233, 234, 235, 236

[56] References Cited

U.S. PATENT DOCUMENTS

| | | | |
|---|---|---|---|
| 4,157,589 | 6/1979 | Kapral et al. | 364/716.05 |
| 4,435,782 | 3/1984 | Kaufman et al. | 364/716.01 |
| 5,436,574 | 7/1995 | Veenstra | 364/716.05 X |
| 5,442,801 | 8/1995 | Sato et al. | 364/716.01 X |
| 5,576,982 | 11/1996 | Wu et al. | 364/715.1 |

OTHER PUBLICATIONS

H. Lindkvist et al., "Techniques for Fast CMOS–based Conditional Sum Adders," 1063–6404/94 © 1994 IEEE, pp. 626–635.

K. Suzuki et al., "A 500 Mhz, 32 bit, 0.4 $\mu$m CMOS RISC Processor," *IEEE Journal of Solid–State Circuits*, vol. 29, No. 12, Dec. 1994, 0018–9200/94 © 1994 IEEE, pp. 1464–1473.

*Primary Examiner*—Chuong Dinh Ngo
*Attorney, Agent, or Firm*—Kelly K. Kordzik; Winstead Sechrest & Minick P.C.; Casimer K. Salys

[57] ABSTRACT

Fixed point instructions ADD, ROTATE, COMPARE-TO-ZERO, AND, OR and COUNT-LEADING-ZEROS are each performable in one circuit or macro. Such fixed point instructions may be implemented within an execution unit in a microprocessor, microcontroller, or digital signal processor.

27 Claims, 10 Drawing Sheets

$P_i = p_i \bullet p_j$ $P_i = p_i \bullet p_j + p_i \bullet s_i + p_j \bullet s_j + s_i \bullet s_j$ $P_i = p_i \cdot p_j + p_i \cdot s_i + p_j \cdot s_j + s_i \cdot s_j$ $G_i = g_i + p_i \cdot g_j$ $P_i = p_i \cdot p_j + p_i \cdot s_i + p_j \cdot s_j + s_i \cdot s_j$ $G_i = g_i$ $P_i = p_i \cdot p_j$ $P_i = p_i$ Select Shift Input
$P_i = p_j$ Select Pass Input
$P_i = p_i$ $P_i = P_i \cdot P_j + P_i \cdot S_i + P_j \cdot S_j$

MULTIFUNCTIONAL MACRO

TECHNICAL FIELD

The present invention relates in general to digital circuitry in data processing systems, and in particular, to circuitry within execution units.

BACKGROUND INFORMATION

General purpose microprocessors usually devote significant area for execution of fixed point or integer instructions that can complete in a single cycle. These instructions include ADD, ROTATE, COMPARE, COUNT-LEADING-ZEROS ("CLZ"), and bitwise-logical operations such as AND and OR. Typically, a separate macro is devoted to each instruction, and the design of each is optimized for its function. A macro is defined herein as a collection of circuits designed to perform an operation on a plurality of inputs to produce an output.

When these various macros are placed on the integrated circuit ("chip"), they very often share input and result paths, so that only one of them can operate in a given cycle. While this may be compatible with other restrictions on the sequencing of instructions in the microprocessor, it results in a low utilization of the silicon. In addition, because each macro is designed separately, many design hours are spent implementing the circuits.

As a result, there is a need in the art for a macro that is multifunctional.

SUMMARY OF THE INVENTION

The foregoing need is satisfied by the present invention, which uses a macro to implement a plurality of operations, or instructions, which include ADD, ROTATE, COMPARE, CLZ, AND, and OR. It will be appreciated by one skilled in the art that equivalent operations, or instructions, other than these listed could be implemented in the present invention. The macro is under operation of a control circuit, which receives instruction, or operation, code and outputs select signals to a plurality of logic circuits arranged in a unique manner for performing the above operations.

The macro may be utilized within a fixed point execution unit within a microprocessor, microcontroller, digital signal processor, or equivalent integrated circuit.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
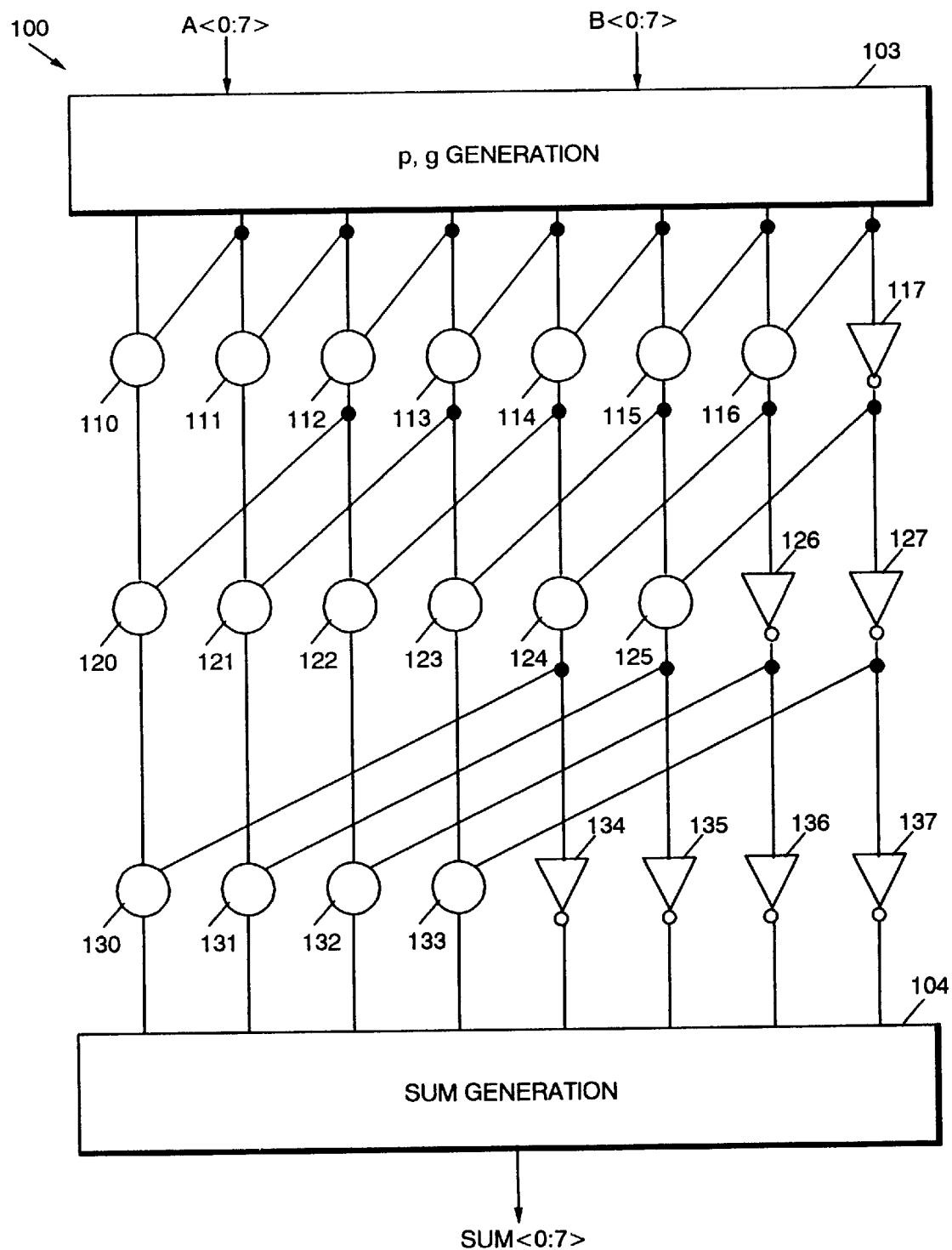
FIG. 1 illustrates a prior art binary carry-lookahead adder.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
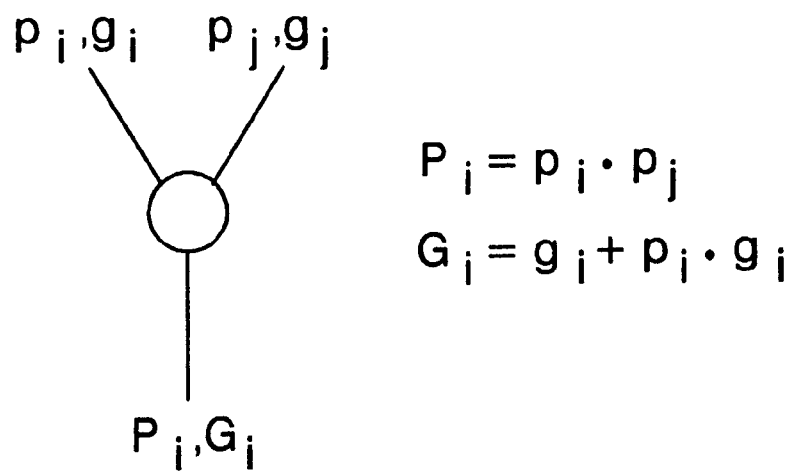
FIGS. 2 and 3 illustrate operations of the logic circuits utilized within the binary carry-lookahead adder illustrated in FIG. 1.
Figure 4:
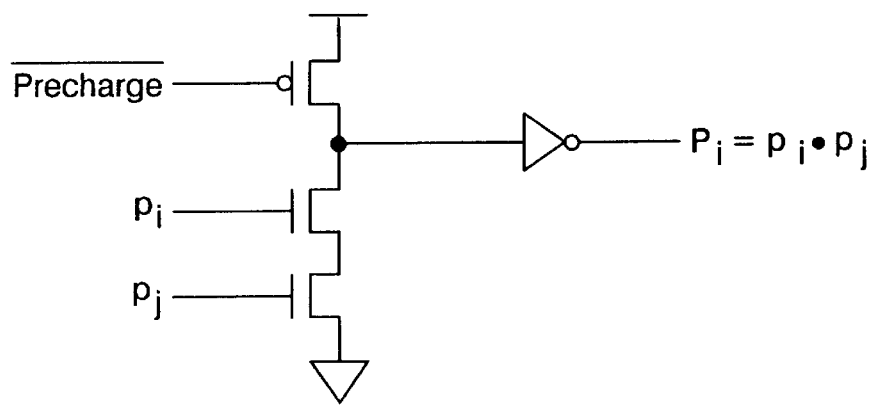
FIG. 4 illustrates a circuit diagram of the logic circuits used within the prior art binary carry-lookahead adder illustrated in FIG. 1.

The present invention modifies binary carry-lookahead adder 100 as illustrated in FIG. 1 so that it can ADD, ROTATE, COMPARE-TO-ZERO, COUNT-LEADING-ZEROS, AND and OR. Adder 100 consists of an input conditioning section 103 that takes the two 8-bit inputs A and B and produces the usual propagate (p) and generate (g) signals for each bit. These signals are then combined in a network of two types of cells. One type of cell, which is further illustrated in FIG. 2 and is represented in FIG. 1 as cells 110–116, 120–125, and 130–133, calculates the group propagate (P) and group generate (G) signals $P_i = p_i \cdot p_j$ and $G_i = g_i + p_i \cdot g_j$. The portion of these cells 110–116, 120–125, and 130–133 that calculates the group propagate signals is also further illustrated in FIG. 4.

Within this description, a plus sign (+) designates an OR operation, while a dot (·) represents an AND operation.

Note that the network of such cells used to calculate P does not include terms involving any $g_i$.

Figure 3:
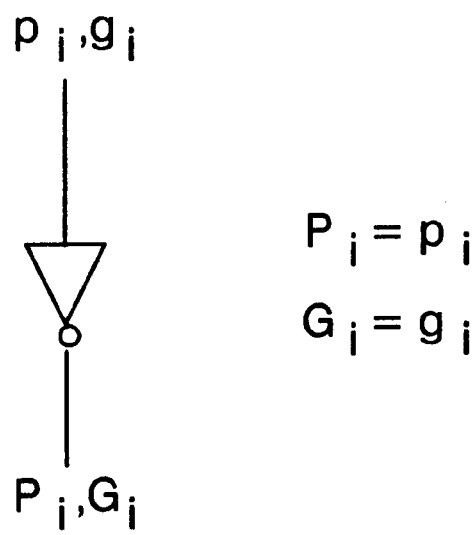

The other type of cell, which is further illustrated in FIG. 3 and labeled in FIG. 1 as cells 117, 126–127 and 134–137, is a buffer with outputs $P_i = p_i$ and $G_i = g_i$.

At the output of the network, adder 100 has sum generation block 104 that uses the $P_i$ and $G_i$ signals to produce the 8-bit sum output of adder 100. One feature of this binary carry-lookahead adder architecture is that the interconnection of group propagate/generate cells resembles a logarithmic shifter.

Figure 5:
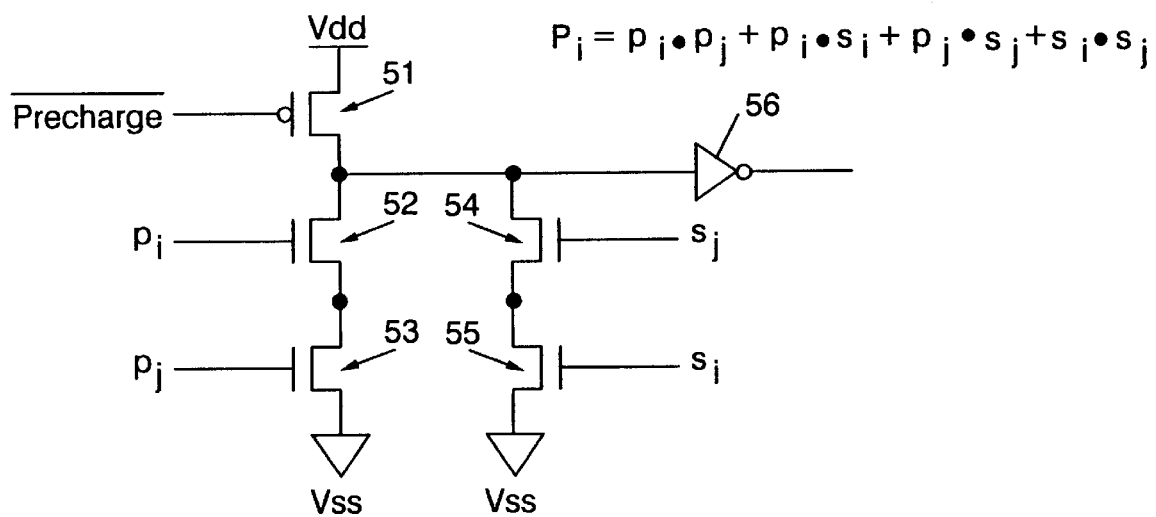
FIG. 5 illustrates a logic circuit used within the macro of the present invention.

The present invention makes two modifications to adder 100 to enable other functions to be performed with the same circuit. The first modification is to the cell used to calculate the group propagate (P) signals. The new circuit is illustrated in FIG. 5, and is shown in a dynamic circuit style, although this choice is not essential to the invention. NFET (N-channel field effect transistor) 52 receives $p_i$, while NFET 53 receives at its gate electrode $p_j$. A precharge signal is provided to PFET (P-channel fet) 51 to precharge the cell. Inverter 56 is provided at the output.

Figure 17:
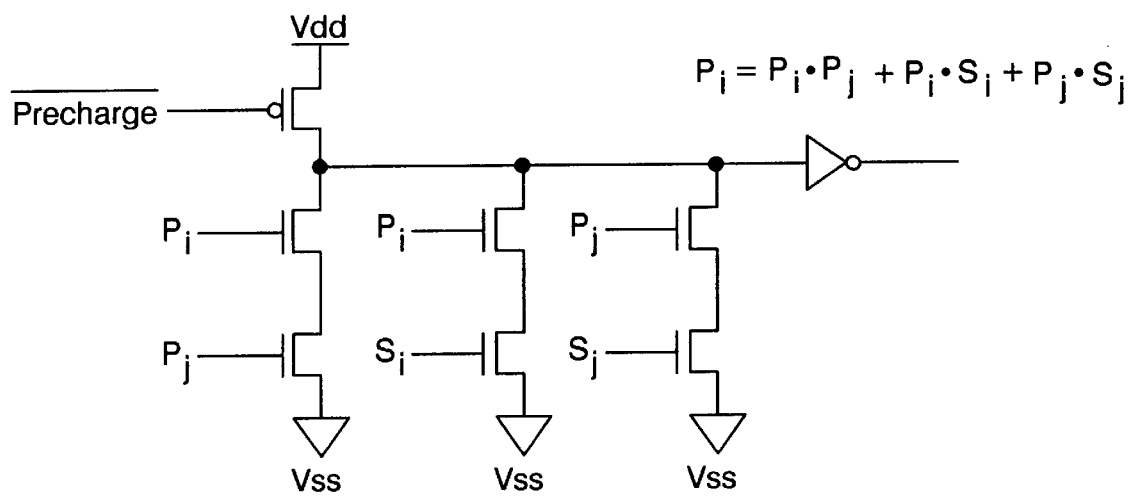
FIG. 17 illustrates an alternative embodiment of the present invention.

With the addition of NFETs 55 and 54 and their controlling inputs $s_i$ and $S_j$, the circuit illustrated in FIG. 5 performs the group propagate function as before (if $s_i$=0 and $s_j$=0) or it functions as a selector, choosing $p_i$, if $s_i$ is equal to 1, or $p_j$, if $s_j$ is equal to 1. An alternative circuit is one that computes $P_i = p_i \cdot p_j + p_i \cdot s_i + p_j \cdot s_j$ (see FIG. 17). This is also further illustrated by the following logic table:

| $s_i$ | $s_j$ | $P_i$ |
|---|---|---|
| 0 | 0 | $p_i \cdot p_j$ |
| 0 | 1 | $p_j$ |
| 1 | 0 | $p_i$ |
| 1 | 1 | 1 |

With this modification to the group propagate cells, and substitution of the circuit illustrated in FIG. 5 for the P component of the buffer cells, the propagate network of adder 100 can be made to operate as a shifter with the appropriate setting of the control signals $s_i$, $s_j$ for each row of cells.

Figure 6:
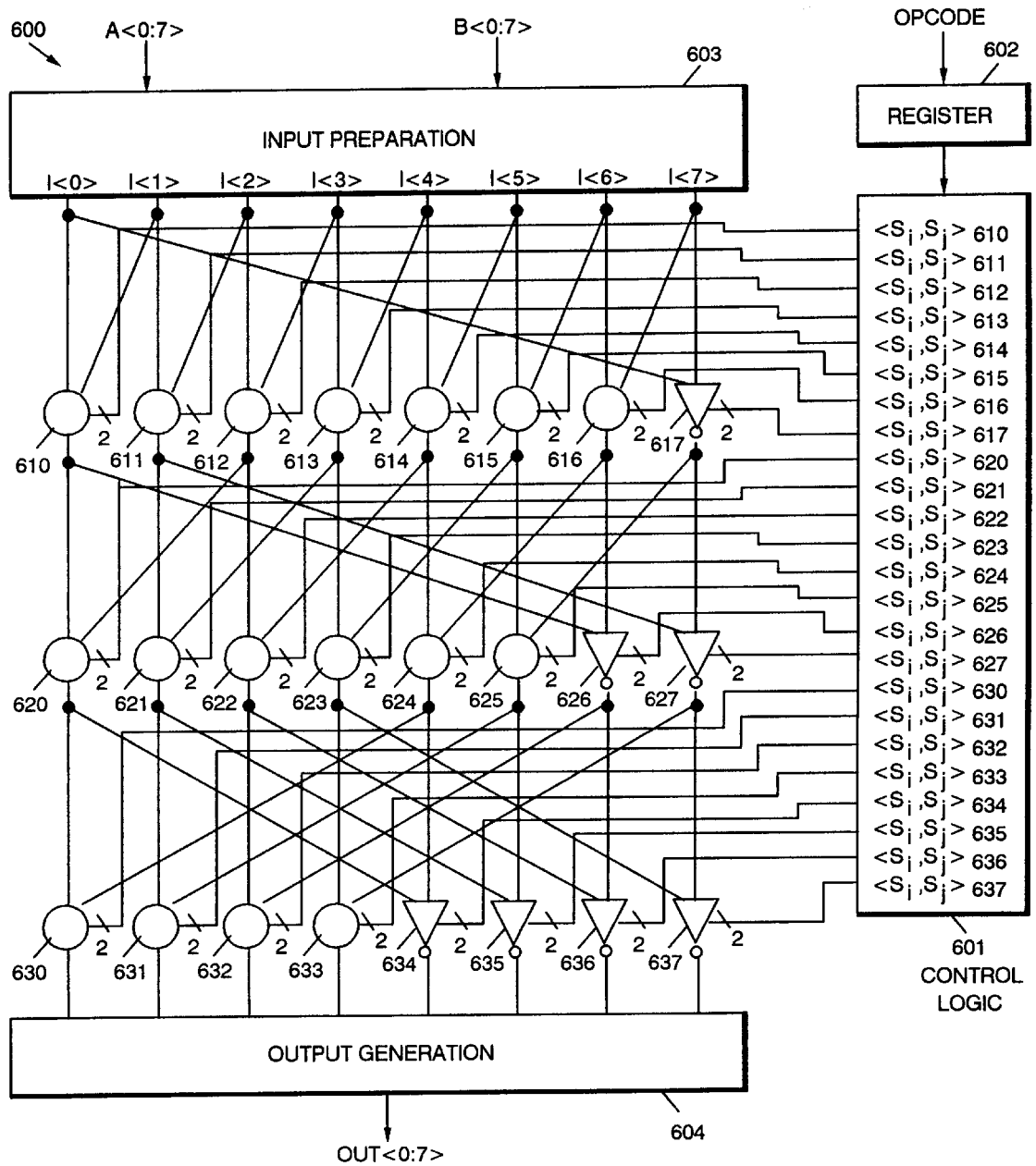
FIG. 6 illustrates an implementation of the macro of the present invention.
Figure 7:
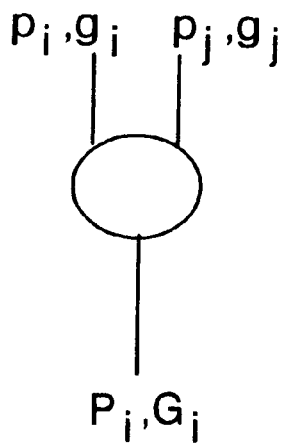
FIGS. 7 and 8 illustrate operations of the logic circuits used within the present invention.
Figure 8:
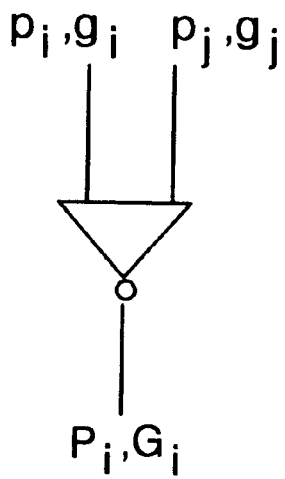

The second modification to adder 100 incorporated into the present invention is the addition of signal paths that convert the network from a shift network to a rotation network. This is illustrated in FIG. 6 by circuit 600. The functions of modified cells 610–616, 620–625, and 630–633 are illustrated in FIG. 7, while the functions of cells 617, 626–627, and 634–637 are illustrated in FIG. 8. The network of cells 610–617, 620–627, and 630–637 is controlled by control logic 601, which supplies the $s_i$ and $s_j$ signals for each of the cells in response to receipt of an opcode (operation, or instruction, code), which is an instruction that is temporarily stored within register 602 before being provided to control logic 601. The opcode may originate from some other part of a microprocessor, microcontroller, or digital signal processor.

Circuit 600 can perform the following operations: ADD, ROTATE, COMPARE-TO-ZERO, COUNT-LEADING-ZEROS, AND, and OR and any other equivalent operations. Input preparation block 603 takes input A<0:7> and B<0:7> and forms combinations of them as required by circuits 610–617, 620–627, and 630–637 for the particular function that macro 600 is to be used to compute as determined by control logic 601. For example, in the case of addition, input preparation logic 603 forms the bitwise propagate and generate signals. For rotation, the A<0:7> input is passed directly to the output of block 603, while for count-leading-zeroes, the logical complement A_<0:7> is passed to the output of block 603.

The output generation circuitry of block 604 processes the results produced by logic blocks 630–637 together with suitable combinations of the inputs to form the required macro output. For example, in the case of addition, logic blocks 630–637 produce the carry signals for each bit, and output generation block 604 combines these signals in the usual way with the half sum A EXOR B to compute the sum of the inputs A and B.

To illustrate the operation of circuit 600 for performing the above instructions, refer to FIGS. 9–15 for the following examples. In these examples, the inputs to the network of logic circuits 610–617, 620–627, 630–637 are labeled A–H. Since the various functions that the proposed macro can implement are determined largely by the operation of the propagate logic blocks, intermediate results from this portion of the logic blocks through each row of logic circuits in circuit 600 are also shown. Note, within FIGS. 9, 12, and 15, the intermediate and final values for the propagate parts of each row of logic circuits are illustrated without the AND designation of a dot (·) between each letter, as has been previously indicated within this description.

Figure 9:
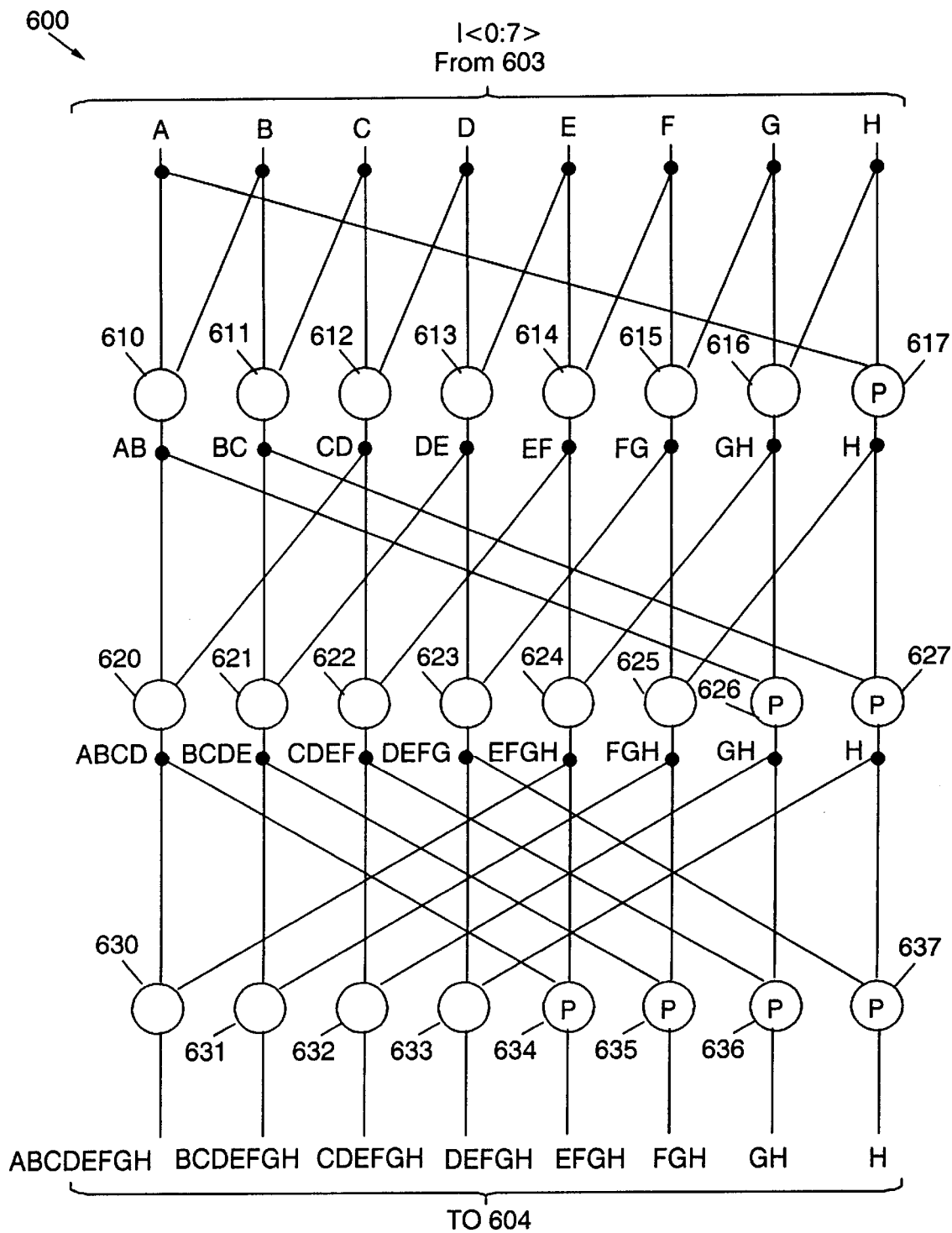
FIG. 9 illustrates an example operation of the present invention performing an ADD operation.

Referring next to FIG. 9, there is illustrated a partial depiction of circuit 600 in an ADD mode. The propagate portions of logic circuits 610–616, 620–625, and 630–633 perform the operation illustrated in FIG. 10, while the propagate portions of logic circuits 617, 626–627, and 634–637 perform the operation further illustrated in FIG. 11. The output of each propagate cell for bitwise propagate inputs A . . . H is shown in FIG. 9. For example, the output of cell 620 is ABCD, representing $P_A \cdot P_B \cdot P_C \cdot P_D$. This combination of propagate signals is used in the generate circuitry of logic circuit 630 to form the carry out for bit 0. Similarly, the outputs of the logic blocks 621–627 are used by the generate circuits in the bottom row to produce the usual carry signal for each bit needed for addition.

Figure 12:
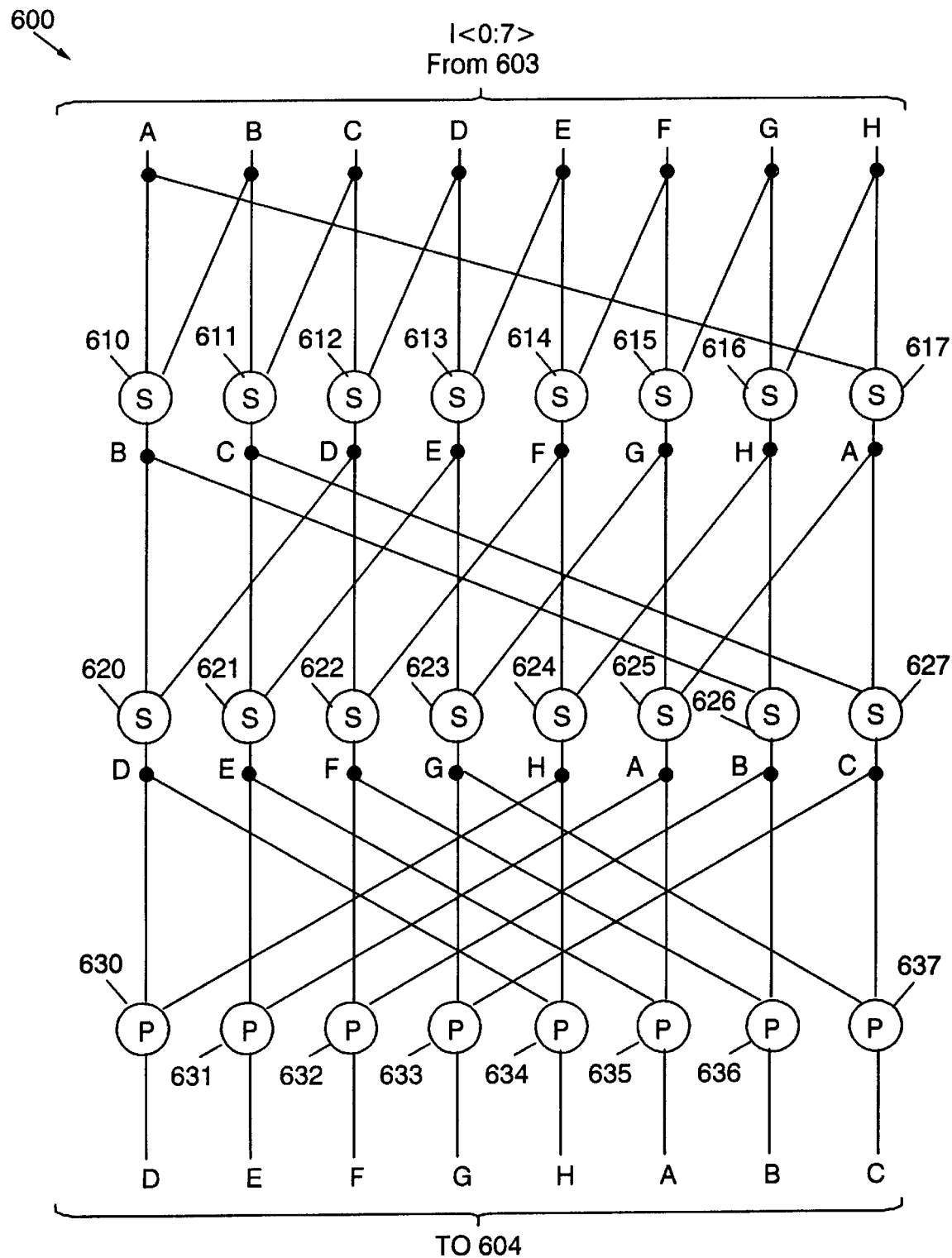
FIG. 12 illustrates an example operation of the present invention performing a ROTATE operation.

Referring next to FIG. 12, for a ROTATE mode, the propagate cells 610–617, 620–627, 630–637 are enabled row-by-row by selecting either a shifted or an unshifted input according to the binary-encoded rotation amount. The example illustrated in FIG. 12 is for the case of "ROTATE by three." The inputs to the propagate network are the data bits themselves. Note that if the input preparation block 603 (see FIG. 6) calculates the bit-wise propagate signals as $p_i = A_i^{in} + B_i^{in}$, that use of $B^{in}$=0 at the input passes $A^{in}$ to the ROTATE network as required.

Figure 13:
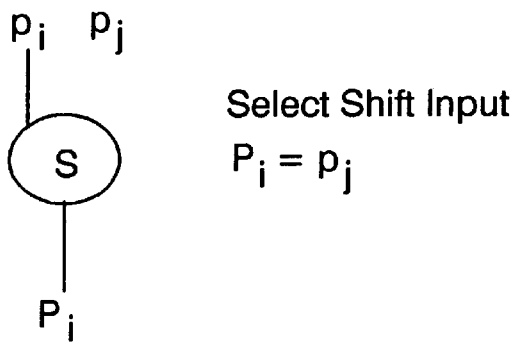
FIGS. 13 and 14 illustrate an operations of the logic circuits for performing the ROTATE operation illustrated in FIG. 12.
Figure 14:
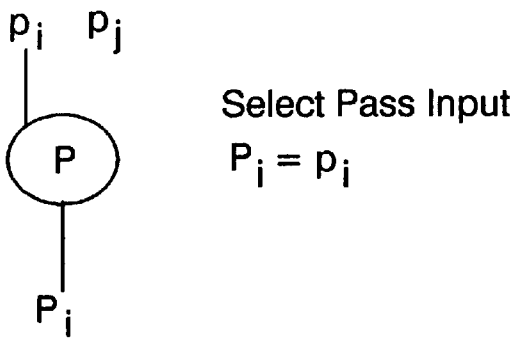

The operation of cells 610–617 and 620–627 is further illustrated in FIG. 13, while the operation of cells 630–637 is further illustrated in FIG. 14. The output of each cell 610–617, 620–627, 630–637 is shown in FIG. 12. As can be seen in FIG. 12, the inputs from block 603, ABCDEFGH, have been ROTATED by three, DEFGHABC, for input to block 604.

Figure 15:
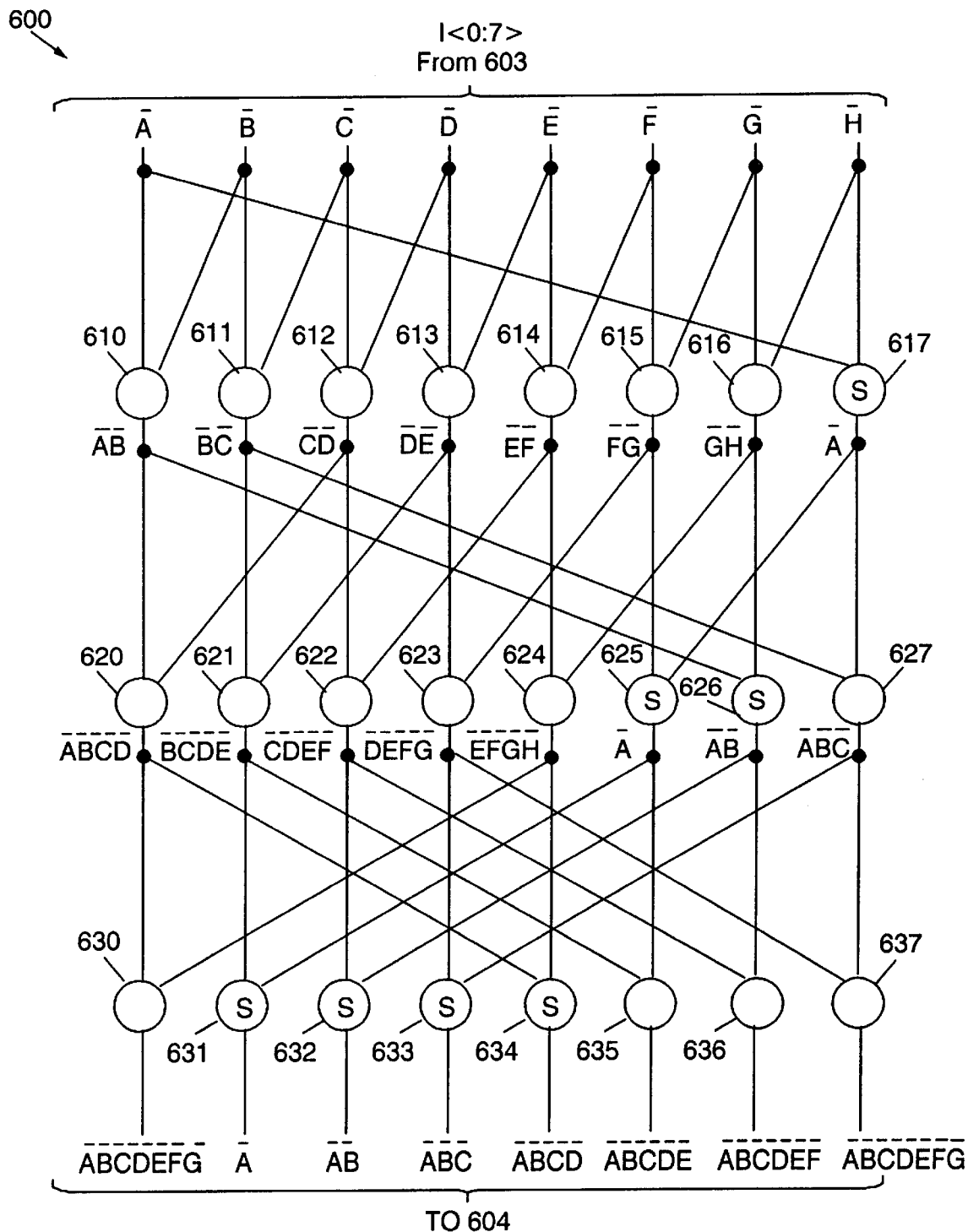
FIG. 15 illustrates an example operation of the present invention implemented to perform a COMPARE-TO-ZERO or CLZ operation.

Referring next to FIG. 15, by setting the inputs from block 603 to the propagate network to be the complement of the input data bits and selectively enabling the shifting function in cells 617, 625–626, and 631–634, the computations needed for the COMPARE-TO-ZERO and CLZ modes can be performed. Inspection of the logical function that network 600 computes shows that the left-most output (equal to $\overline{A} \cdot \overline{B} \cdot \overline{C} \cdot \overline{D} \cdot \overline{E} \cdot \overline{F} \cdot \overline{G}$) from cell 630 will be "1" only if all of the inputs (A, B, C, D, E, F, G, H) are zero (COMPARE-TO-ZERO). The remaining outputs form a "thermometer encoding" of the position of the first "1" in the input data (A, B, C, D, E, F, G, H). For example, if the input data is 00001011, then A . . . H are 11110100, and the network outputs are 01111000. The first zero digit indicates the compare-to-zero condition ABCDEFGH=00000000 is false. The remaining 7-bit thermometer code can be subsequently converted to a binary number indicating the number of leading zeros in the output generation portion of the macro 600, specifically 1111000, can be converted to binary 4 (0100) in this example.

Figure 10:
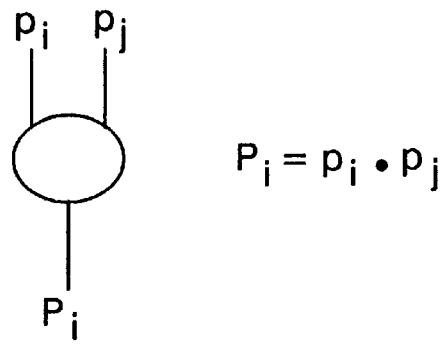
FIGS. 10 and 11 illustrate operations of the logic circuits for performing the ADD operation illustrated in FIG. 9.
Figure 11:
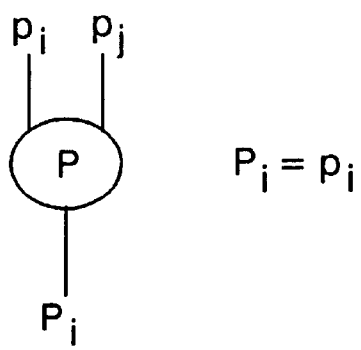

Cells 610–616, 620–624, 627, 630 and 635–637 perform an AND operation as further illustrated in FIG. 10, while cells 617, 625–626, and 631–634, perform a select shift input operation as further illustrated in FIG. 13.

Figure 16:
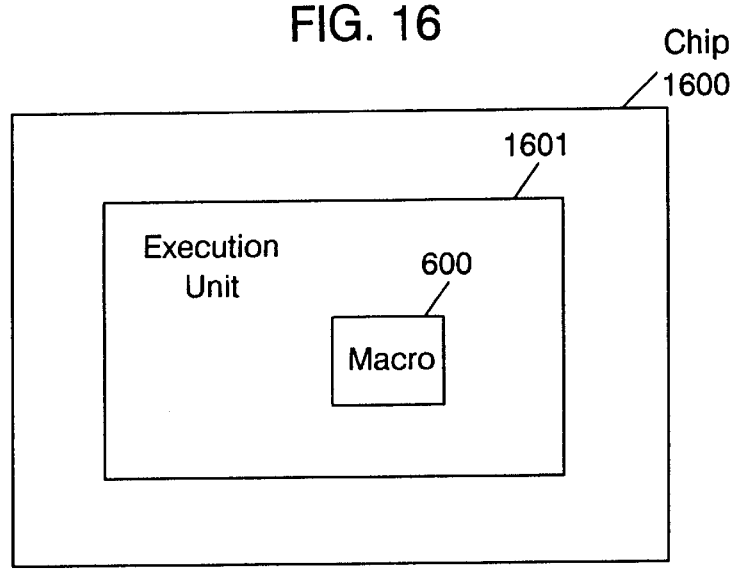
FIG. 16 illustrates the present invention implemented in a chip.

Referring next to FIG. 16, there is illustrated in block diagram form chip 1600 having execution unit 1601 implemented thereon. Execution unit 1601 may utilize macro 600 in accordance with the present invention to perform any one of the various functions described herein.

Although the present invention and its advantages have been described in detail, it should be understood that various changes, substitutions and alterations can be made herein without departing from the spirit and scope of the invention as defined by the appended claims.

What is claimed is:

1. A macro, comprising:
    input circuitry operable for receiving two or more numbers;
    logic circuitry, coupled to said input circuitry, operable for performing one of two or more logical functions on said two or more numbers, wherein said logic circuitry further comprises:
       a plurality of interconnected rows of logic circuits; and
       control circuitry, coupled to said plurality of interconnected rows of logic circuits, operable for controlling operations of said logic circuits to perform said one of two or more logical functions on said two or more numbers in response to an operation code, wherein each of said logic circuits is operable for receiving two numbers, A and B, and two select signals, S1 and S2, and wherein each of said logic circuits is operable for performing the following operation to output Z as a function of A, B, S1, and S2: Z=A·B+A·S2+B·S1; and
    output circuitry, coupled to said logic circuitry, operable for outputting a result of said one of two or more logical functions.

2. The macro as recited in claim 1, wherein said two or more logical functions are ADD and ROTATE.

3. The macro as recited in claim 1, wherein said two or more logical functions are ADD and COMPARE.

4. The macro as recited in claim 1, wherein said two or more logical functions are ADD and COUNT-LEADING-ZEROES.

5. The macro as recited in claim 1, wherein said two or more logical functions are ADD and AND.

6. The macro as recited in claim 1, wherein said two or more logical functions are ROTATE and COMPARE.

7. The macro as recited in claim 1, wherein said two or more logical functions are ROTATE and COUNT-LEADING-ZEROES.

8. The macro as recited in claim 1, wherein said two or more logical functions are ROTATE and AND.

9. The macro as recited in claim 1, wherein said two or more logical functions are COMPARE and COUNT-LEADING-ZEROES.

10. The macro as recited in claim 1, wherein said two or more logical functions are COMPARE and AND.

11. The macro as recited in claim 1, wherein said two or more logical functions are COUNT-LEADING-ZEROES and AND.

12. The macro as recited in claim 1, wherein said two or more logical functions are ADD, ROTATE, and COMPARE.

13. The macro as recited in claim 1, wherein said two or more logical functions are ADD, ROTATE, and COUNT-LEADING ZEROES.

14. The macro as recited in claim 1, wherein said two or more logical functions are ADD, ROTATE, and AND.

15. The macro as recited in claim 1, wherein said two or more logical functions are ROTATE, COMPARE, and COUNT-LEADING-ZEROES.

16. The macro as recited in claim 1, wherein said two or more logical functions are ROTATE, COMPARE, and AND.

17. The macro as recited in claim 1, wherein said two or more logical functions are COMPARE, COUNT-LEADING-ZEROES, and AND.

18. The macro as recited in claim 1, wherein said two or more logical functions are ADD, ROTATE, COMPARE, and COUNT-LEADING-ZEROES.

19. The macro as recited in claim 1, wherein said two or more logical functions are selected from the group consisting of:
    ADD;
    ROTATE;
    COMPARE;
    COUNT-LEADING-ZEROES;
    AND; and
    OR.

20. The macro as recited in claim 19, wherein said macro is part of a fixed point execution unit in a microprocessor.

21. The macro as recited in claim 19, wherein said macro is part of a fixed point execution unit in a microcontroller.

22. The macro as recited in claim 19, wherein said macro is part of a fixed point execution unit in a digital signal processor.

23. The macro as recited in claim 1, wherein said two numbers, A and B, are received from either said input circuitry or a previous one of said plurality of interconnected rows of logic circuits, and wherein select signals, S1 and S2, are received from said control circuitry.

24. The macro as recited in claim 23, wherein said two or more logical functions are selected from the group consisting of:
    ADD;
    ROTATE;
    COMPARE;
    COUNT-LEADING-ZEROES;
    AND; and
    OR.

25. The macro as recited in claim 24, wherein said input circuitry produces eight input signals, I0, I2, I3, I4, I5, I6, and I7, wherein a first logic circuit in a first one of said plurality of interconnected rows receives I0 and I1, wherein a second logic circuit in said first one of said plurality of interconnected rows receives I1 and I2, wherein a third logic circuit in said first one of said plurality of interconnected rows receives I2 and I3, wherein a fourth logic circuit in said first one of said plurality of interconnected rows receives I3 and I4, wherein a fifth logic circuit in said first one of said plurality of interconnected rows receives I4 and I5, wherein a sixth logic circuit in said first one of said plurality of interconnected rows receives I5 and I6, wherein a seventh logic circuit in said first one of said plurality of interconnected rows receives I6 and I7, wherein an eighth logic circuit in said first one of said plurality of interconnected rows receives I0 and I7.

26. The macro as recited in claim 25, wherein said first, second, third, fourth, fifth, sixth, seventh, and eighth logic circuits produce output signals, X0, X1, X2, X3, X4, X5, X6, and X7, respectively, and wherein a first logic circuit in a second one of said plurality of interconnected rows receives X0 and X2, and wherein a second logic circuit in said second one of said plurality of interconnected rows receives X1 and X3, and wherein a third logic circuit in said second one of said plurality of interconnected rows receives X2 and X4, and wherein a fourth logic circuit in said second one of said plurality of interconnected rows receives X3 and X5, and wherein a fifth logic circuit in said second one of said plurality of interconnected rows receives X4 and X6, and wherein a sixth logic circuit in said second one of said plurality of interconnected rows receives X5 and X7, and wherein a seventh logic circuit in said second one of said plurality of interconnected rows receives X6 and X0, and wherein an eighth logic circuit in said second one of said plurality of interconnected rows receives X7 and X1.

27. The macro as recited in claim 26, wherein said first, second, third, fourth, fifth, sixth, seventh, and eighth logic circuits in said second one of said plurality of interconnected rows produce output signals, Y0, Y1, Y2, Y3, Y4, Y5, Y6, and Y7, respectively, and wherein a first logic circuit in a third one of said plurality of interconnected rows receives Y0 and Y4, and wherein a second logic circuit in said third one of said plurality of interconnected rows receives Y1 and Y5, and wherein a third logic circuit in said third one of said plurality of interconnected rows receives Y2 and Y6, and wherein a fourth logic circuit in said third one of said plurality of interconnected rows receives Y3 and Y7, and wherein a fifth logic circuit in said third one of said plurality of interconnected rows receives Y4 and Y0, and wherein a sixth logic circuit in said third one of said plurality of interconnected rows receives Y5 and Y1, and wherein a seventh logic circuit in said third one of said plurality of interconnected rows receives Y6 and Y2, and wherein an eighth logic circuit in said third one of said plurality of interconnected rows receives Y7 and Y3.

* * * * *

UNITED STATES PATENT AND TRADEMARK OFFICE
CERTIFICATE OF CORRECTION

PATENT NO. : 6,065,028
DATED : May 16, 2000
INVENTOR(S) : Sang Hoo Dhong; Joel Abraham Silberman It is certified that error appears in the above-identified patent and that said Letters Patent is hereby corrected as shown below:

Column 3, Line 12, after "and", replace "$S_j$" with --$s_j$--

Signed and Sealed this

Twenty-second Day of May, 2001

Attest:

NICHOLAS P. GODICI

*Attesting Officer*  *Acting Director of the United States Patent and Trademark Office*